United States Patent Office 3,150,149
Patented Sept. 22, 1964

3,150,149
DIAMINO PHOSPHORUS DERIVATIVES OF RING NITROGEN HETEROCYCLIC COMPOUNDS
Jan Hendrik Uhlenbroek and Bernardus Gerhardus van den Bos, Weesp, Netherlands, assignors to North American Philips Company, Inc., New York, N.Y., a corporation of Delaware
No Drawing. Filed Mar. 7, 1960, Ser. No. 12,952
Claims priority, application Netherlands Mar. 6, 1959
6 Claims. (Cl. 260—310)

This invention relates to new and novel phosphorus containing heterocyclic compounds, to methods of preparing these compounds and to the use of these compounds as pesticides.

As the population of the world steadily increases the demand for food also increases. One of the most important means of meeting this ever increasing demand for food is to increase the crop production of land under cultivation. In order to obtain the maximum crop yield it is necessary to prevent plant destructive pests such as insects, mites, fungi and weeds from destroying the desirable crop. In order to combat these pests many types of compounds have been tried. However, very few have been found to be successful. An increase in the number of effective pesticides is therefore considered to be of prime importance.

It is a principal object then of this invention to produce new and novel phosphorus containing heterocyclic compounds.

It is another principal object of this invention to provide new chemical compounds that are useful for the destruction of plant harmful pests and which are relatively harmless to warm blooded animals.

These and other objects of the invention will be apparent from the description that follows:

According to the invention new and novel phosphorus containing heterocyclic compounds are provided. These compounds correspond to the general formula:

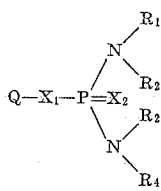

wherein Q represents a heterocyclic ring containing radical in which the heterocyclic ring contains from 2 to 4 hetero atoms at least one of which is nitrogen and has aromatic properties, $X_1$ and $X_2$ represent a member of the group consisting of oxygen and sulfur, $R_1$, $R_2$, $R_3$ and $R_4$ each represent lower alkyl radicals and $X_1$ is bound to a carbon atom of the heterocyclic ring. In these compounds it is preferred that the hetero atoms in the heterocyclic ring be selected from the group consisting of N, O and S.

The heterocyclic ring may be fused with a benzene ring and also may be substituted by one or more substituents. Among these substituents are alkyl, alkenyl, cycloalkyl, cycloalkenyl, aryl, aralkyl, alkylamino, dialkylamino, arylamino, diarylamino, acylamino, alkoxy, alkyl mercapto, halogen atoms, particularly chlorine atoms and amino groups. Of these substituents amino, phenyl and alkyl groups containing from 1 to 7 carbon atoms are preferred. Examples of radicals that Q may represent thus are benzoxazolyl, 1,2,4-triazolyl, 5-phenyl-1,2,4-triazolyl, 5-pentyl-1,2,4-triazolyl, 5-methyl-1,2,4-triazolyl, 5-chloro-1,2,4-triazolyl, 5-heptyl-1,2,4-triazolyl, 1,2,4-triazolyl, 4-phenyl-1,2,3-triazolyl, 4-methyl-1,2,3-triazolyl, tetrazolyl, 3-methyl-1,2,4-triazolyl, oxazolyl, thiazolyl, 4-methyl-thiazolyl, 4 - phenyl - thiazolyl, 4 - (4' - bromophenyl)thi-azolyl, benzothiazolyl, imidazolyl, 4-chloro-imidazolyl, 2-isopropyl-4-methyl-pyrimidyl, 4,6-dimethyl - pyrimidyl, 2,4-dimethyl-pyrimidyl, imidazolyl, indazolyl, pyridazolyl, pyrazinyl, 3-amino-1-phenyl-pyrazolyl, 1-phenyl-3-methyl-pyrazolyl, 3-methyl-pyrazolyl, 1 - (4' - nitrophenyl)-3-methyl-pyrazolyl, 3-methyl-pyrazolyl, 1-(4'-chlorophenyl)-3-methyl-pyrazolyl, 1,3-dimethyl-pyrazolyl, 1-nonyl-3-methyl-pyrazolyl, 1,3-diphenyl-pyrazolyl, 1-(2'-chlorophenyl)-3-methyl-pyrazolyl, 3-phenyl-pyrazolyl, 1 - pentyl-3-methyl-pyrazolyl and 1-pentyl-3-phenyl-pyrazolyl.

$R_1$, $R_2$, $R_3$ and $R_4$ preferably represent alkyl groups containing from 1 to 5 carbon atoms. Of these, methyl is the most suitable.

These novel compounds are very effective insecticides, fungicides and acaracides and are particularly useful in the destruction of red spider mites and mould species of the family of the Erysiphaceae. In addition many of these compounds are very useful in the control of weeds.

The compounds of the invention are safe to use as they are relatively non-toxic to warm-blooded animals.

Of the novel compounds of the invention it has been found that the derivatives of pyrazole-5-one particularly those substituted on the heterocyclic ring by alkyl groups containing 1 to 9 and preferably 1 to 4 carbon atoms and those substituted with phenyl preferably chlorophenyl groups have excellent insecticidal and fungicidal properties. In fact some of these derivatives, particularly those in which the pyrazole-5-one is substituted on the ring nitrogen by an alkyl or phenyl group, have been found to be the most effective fungicides tested.

The preparation of the compounds according to the invention may be carried out so that the amidophosphoryl or the amidothionophosphoryl group is carried out in 1 or 2 reaction stages.

In these methods a heterocyclic compound Q—$X_1$—H or Q—$X_1$—Me wherein $X_1$ and Q have their above-noted meanings and Me represents a metal preferable sodium or potassium is reacted with a compound corresponding to the general formula

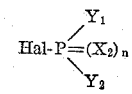

wherein Hal represents halogen, such as fluorine or bromine but preferably chlorine, $n$ represents 0 or 1, $X_2$ has its previously indicated meaning and $Y_1$ and $Y_2$ are each selected from the group consisting of halogen, particularly chlorine,

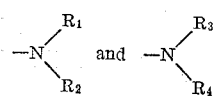

wherein $R_1$, $R_2$, $R_3$ and $R_4$ have their previously indicated meaning to produce a compound corresponding to the general formula

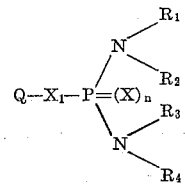

either directly or when $Y_1$ or $Y_2$ represents a halogen after treatment with a dialkylamine.

In those cases in which $n=0$ the products are oxidized or reacted with sulfur to produce compounds in which $n=1$. In any event when a compound $Q-X_1-H$ is employed or when $Y_1$ or $Y_2$ represents a halogen the reaction is carried out in the presence of a hydrogen-halide binding agent such as amines, particularly trialkylamines for example trimethylamine, triethylamine, N,N-dialkylanilines, pyridine and particularly homologues there of for example picolines, lutidines and collidine and mixtures thereof.

Another group of hydrogen-halide binding agents which may be employed comprises compounds of sodium, potassium, magnesium, calcium, barium and zinc, such as oxides, hydroxides, carbonates, bicarbonates, alcoholates, and carboxylic acid salts. Especially sodium and potassium alcoholates are suitable in particular in combination with the use of the corresponding alcohols as diluting agents.

As starting material for the preparation of the compounds according to the invention, preferably compounds of the formula $Q-X_1-Me$ are used, in which $Q$, $X_1$ and $Me$ have the indicated meanings, and in particular those in which $Me$ represents a sodium atom.

The process of production of the compounds is preferably carried out in the presence of a solvent for the heterocyclic compounds used as starting material. Suitable solvents are, for example, aliphatic and aromatic hydrocarbons, such as petroleum ether and benzene, aliphatic ethers, tertiary amines, for example pyridines, nitriles such as acetonitrile, ketones such as acetone and methylethylketone, esters such as ethyl acetate, and in addition, nitrobenzene and carbon tetrachloride. When metal compounds of the formula $Q-X_1-Me$ are employed, these solvents may also be used as diluting agents.

The reactions are preferably carried out at elevated temperature, for example between 50° C. and 120° C.

EXAMPLE I 10.2 g. of the sodium derivative of benzoxazolone (obtained by evaporating equivalent quantities of sodium ethylate in ethanol and benzoxabolone until no more ethanol distilled), 80 cc. of acetonitrile and 14.2 g. of bis (N.N - dimethylamido) - phosphorylchloride were mixed and refluxed. After cooling, the separated sodium chloride was sucked off and the filtrate evaporated. The residue was dissolved in ether, the ethereal solution was washed with water, dried on sodium sulphate and evaporated. The residue is a pale yellow oil. Yield: 15.6 g. (78%).

$P=11.50\%$ calculated. $P=11.0\%$ found.

EXAMPLE XXVI 17.0 g. of 3-hydroxy 1,2,4-triazole were suspended in a mixture of 40 cc. of collidine and 10 cc. of acetonitrile. 34.1 g. of bis (dimethylamido)-phosphorylchloride were added dropwise at a temperature between 70° C. and 80° C. At this temperature, the reaction mixture was then stirred for about 3 hours. After cooling, the resulting precipitate was sucked off, dissolved in water, and neutralized with sodium hydroxide solution. The collidine reformed on netralization was removed by washing with petroleum ether (boiling range 40° C. to 60° C.). The aqueous solution was evaporated and the residue extracted with methanol. The methanolic solution was evaporated and the residue crystallized from a mixture of chloroform and ethylacetate (1:1).

Yield: 16 gms. (37%). Melting point: 147–149.5° C.

The Examples II to XXV, given in Table I have been carried out in a manner analogous to that of Example I, and Example XXVII in a manner analogous to that of Example XXVI. In this table there are successively stated the numbers of the example, the starting materials, the diluting agents, the reaction temperatures, the yields of resulting products, calculated on the quantities of heterocyclic compound used and the boiling point or melting point of the resultant product. The boiling point is indicated by F, followed by the temperature in ° C. and the relative pressure in mm. mercury column and the melting point is indicated by S and expressed in ° C.

In Table II, the name of the resulting compound is given next to the number of the example.

*Table I*

| No. | Starting substances | Diluting agent | Reaction-temp., ° C. | Yield in percent | Physical constants |
|---|---|---|---|---|---|
| I | Benzoxazolone | Acetonitrile | About 80 | 78 | S=109–111° C. |
| II | Benzoxazolethione | do | do | 75 | S=185–187° C. |
| III | 3-mercapto-triazole-1,2,4 | Acetone | About 55 | 30 | (Oil.) |
| IV | 3-mercapto-5-pentyl-triazole-1,2,4 | do | do | 65 | (Oil.) |
| V | 2-hydroxy-4-methylthiazole-1,3 | Acetonitrile | About 80 | 86 | F=119–119.5° C. at 0.2–0.3 mm. |
| VI | 2-hydroxy-4-phenylthiazole-1,3 | do | do | 86 | S=56–59° C. |
| VII | 2-hydroxy-4-(4'-bromophenyl)-thiazole-1,3 | do | do | 67 | S=61–62° C. |
| VIII | 2-isopropyl-4-methyl-6-hydroxypyrimidine | Benzene | do | 81 | (Oil.) |
| IX | 4,6-dimethyl-2-hydroxypyrimidine | Xylene | About 140 | 47 | S=60–75° C. |
| X | 2,4-dimethyl-6-hydroxypyrimidine | Benzene | About 80 | 68 | (Oil.) |
| XI | 3-phenyl-5-mercapto-thiadiazole-1,2,4 | Acetonitrile | do | 73 | Do. |
| XII | 3-amino-1-phenylpyrazole-5-one | do | 70–80 | 33 | S=142–143° C. |
| XIII | 1-phenyl-3-methylpyrazole-5-one | Benzene | About 60 | 70 | (Oil.) |
| XIV | 3-methylpyrazole-5-one | Acetonitrile | do | 60 | Do. |
| XV | 1-(4'-nitrophenyl)-3-methyl-pyrazole-5-one | Benzene | About 70 | 55 | S=118–119° C. |
| XVI | 1-(4'-chlorophenyl)-3-methyl-pyrazole-5-one | Acetonitrile | About 65 | 67 | S=84–85° C. |
| XVII | 1,3-dimethylpyrazole-5-one | do | About 80 | 96 | (Oil.) |
| XVIII | Indazolone | do | do | 99 | Do. |
| XIX | 1-nonyl-3-methylpyrazole-5-one | do | do | 95 | Do. |
| XX | 1,3-diphenylpyrazole-5-one | do | do | 98 | Do. |
| XXI | 1-(2'-chlorophenyl)-3-methylpyrazole-5-one | do | do | 85 | S=93–94° C. |
| XXII | 3-phenylpyrazole-5-one | do | do | 84 | S=229–231° C. |
| XXIII | 1-pentyl-3-methylpyrazole-5-one | do | do | 87 | (Oil.) |
| XXIV | 1-pentyl-3-phenylpyrazole-5-one | do | do | 99 | Do. |
| XXV | Benzthiazolone | do | do | 77 | Do. |
| XXVI | 3-hydroxy triazole-1,2,4 | do | do | 70–80 | S=147–149.5° C. |
| XXVII | 3-methyl-5-hydroxy triazole-1,2,4 | Collidine | 100 | 84 | (Oil.) |

Table II

| Example | Product |
|---|---|
| I | Bis(N,N-dimethylamido)benzoxazolyl-2-phosphate. |
| II | Bis(N,N-dimethylamido)-S-benzoxazolylphosphate. |
| III | Bis(N,N-dimethylamido)-S-(triazolyl-1,2,4)-3-phosphate. |
| IV | Bis(N,N-dimethylamido)-S-(5-pentyltriazolyl-1,2,4)-3-phosphate. |
| V | Bis(N,N-dimethylamido)-O-(4-methylthiazolyl-2)phosphate. |
| VI | Bis(N,N-dimethylamido)-O-(4-phenylthiazolyl-2)phosphate. |
| VII | Bis(N,N-dimethylamido)-O-(4-(4'-bromophenyl)thiazolyl-2)phosphate. |
| VIII | Bis(N,N-dimethylamido)-O-(2-isopropyl-4-methylpyrimidyl-6)phosphate. |
| IX | Bis(N,N-dimethylamido)-O-(4,6-dimethylpyrimidyl-2)phosphate. |
| X | Bis(N,N-dimethylamido)-O-(2,4-dimethylpyrimidyl-6)phosphate. |
| XI | Bis(N,N-dimethylamido)-S-(3-phenylthiadiazolyl-1,2,4)-5-phosphate. |
| XII | Bis(N,N-dimethylamido)-O-(3-amino-1-phenylpyrazolyl-5)phosphate. |
| XIII | Bis(N,N-dimethylamido)-O-(1-phenyl-3-methylpyrazolyl-5)phosphate. |
| XIV | Bis(N,N-dimethylamido)-O-(3-methylpyrazolyl-5)phosphate. |
| XV | Bis(N,N-dimethylamido)-O-(1)-4'-nitrophenyl(3-methylpyrazolyl-5)phosphate. |
| XVI | Bis(N,N-dimethylamido)-O-(1)-4'-chlorophenyl(3-methylpyrazolyl-5)phosphate. |
| XVII | Bis(N,N-dimethylamido)-O-(1,3-dimethylpyrazolyl-5)phosphate. |
| XVIII | Bis(N,N-dimethylamido)-O-indazolylphosphate. |
| XIX | Bis(N,N-dimethylamido)-O-(1-nonyl-3-methylpyrazolyl-5)phosphate. |
| XX | Bis(N,N-dimethylamido)-O-(1,3-diphenylpyrazolyl-5)phosphate. |
| XXI | Bis(N,N-dimethylamido)-O-[1-(2'-chlorophenyl)-3-methylpyrazolyl]phosphate. |
| XXII | Bis(N,N-dimethylamido)-O-(3-phenylpyrazolyl-5)phosphate. |
| XXIII | Bis(N,N-dimethylamido)-O-(1-pentyl-3-methylpyrazolyl-5)phosphate. |
| XXIV | Bis(N,N-dimethylamido)-O-(1-pentyl-3-phenylpyrazolyl-5)phosphate. |
| XXV | Bis(N,N-dimethylamido)-O-benzthiazolyl-2-phosphate. |
| XXVI | Bis(N,N-dimethylamido)-O-(triazolyl-1,2,4)-3-phosphate. |
| XXVII | Bis(N,N-dimethylamido)-O-(3-methyltriazolyl-1,2,4)-5-phosphate. |

The active compounds of the invention may be formulated and employed in the conventional manner for destroying the noxious organisms. Thus they may be mixed with solid carriers, ground to the desired particle size and dusted on the crops. Examples of the solid carriers that may be employed are pipe clay, diatomaceous earth, kaolin, dolomite, talcum, gypsum, bentonite, attapulgite, kieselguhr, celite, wood meal, tobacco dust, ground walnut shells and ground cocoanut shells. In these dusts the concentration of the active compound usually lies between about 1–22% by weight.

The active compounds of the invention may also be applied to the crops in the form of suspensions in a volatile liquid, usually water. In preparing such a suspension the active compound is formed into a wettable powder and then dispersed in a volatile solvent such as water. In the formulation of the wettable powder the active compound is ground with a solid carrier of the type employed in forming a dust and a suitable dispersion agent such as a lignin sulfonate or a naphthalene sulfonate and/or a suitable wetting agent such as a fatty acid sulfonate, an alkaryl sulfonate or an acid condensation product of the type sold under the trademark "Igepon" are added. In the wettable powder the concentration of the active compound may vary between wide limits. However, a concentration of between about 10 to 80% by weight is usually preferred.

Finally the active compounds of the invention may be applied to the crops in the form of emulsions in water or other volatile liquids. In preparing these emulsions the active compound is first formed into a miscible oil. These miscible oils contain besides the active compound a water insoluble solvent for the active compound and an emulsifier. Among solvents that may be employed are xylene, toluene, dioxane, aromatic petroleum distillates such as solvent naptha, distilled tar oil, tetralene and cyclohexane and mixtures of these liquids. Among the emulsifiers that may be employed are the alkyl phenoxy-glycol ethers, polyoxyethylene sorbitan esters of fatty acids, polyoxyethylene-sorbitolesters of fatty acids and the emulsifiers known by the trademarks "Tween," "Triton" and "Atlox." The concentration of the active-compound in the solvent is usually about 2–50% by weight and in the emulsion the concentration of the active compound is usually between about 0.01 to 0.5% by weight.

While we have described our invention in connection with specific embodiments and applications, other modifications thereof will be readily apparent to those skilled in this art without departing from the spirit and scope of the invention as defined in the appended claims.

What is claimed is:

1. A phosphorous heterocyclic compound of the formula:

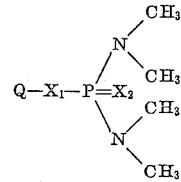

wherein Q is a monovlaent heterocyclic ring containing radical selected from the group consisting of the unsubstituted heterocyclic radicals: benzoxazolyl, 1,2,4-triazolyl, thiazolyl, pyrimidyl, pyrazolyl, 1,2,4-thiodiazolyl and indazolyl and said heterocyclic radicals substituted with alkyl of 1 to 7 carbon atoms, phenyl, chlorophenyl, bromophenyl, nitrophenyl, amino and chloro and $X_1$ and $X_2$ are bivalent atoms of group VI of the periodic table having atomic weights of 16 to 32 inclusive and Q is joined to $X_1$ through a carbon atom in the heterocyclic ring.

2. The compound of claim 1 in which Q is pyrazole-5-one substituted with alkyl of 1 to 4 carbon atoms at one of the ring nitrogen atoms.

3. The compound of claim 1 in which Q is pyrazole-5-one substituted with the phenyl at one of the ring nitrogen atoms.

4. The compound of claim 1 in which Q is pyrazole-5-one substituted with the chlorophenyl at one of the ring nitrogen atoms.

5. The compound of claim 1 in which Q is pyrazole-5-one substituted with the nitrophenyl at one of the ring nitrogen atoms.

6. The compound of claim 1 in which Q is pyrazole-5-one substituted with the pentyl at one of the ring nitrogen atoms.

References Cited in the file of this patent

UNITED STATES PATENTS

| | | |
|---|---|---|
| 2,552,537 | Drake et al. | May 15, 1951 |
| 2,751,384 | Coover et al. | June 19, 1956 |
| 2,844,510 | Lorenz et al. | July 22, 1958 |
| 2,888,379 | Bruning et al. | May 26, 1959 |
| 3,010,969 | Rigterink | Nov. 28, 1961 |

FOREIGN PATENTS

| | | |
|---|---|---|
| 713,278 | Great Britain | Aug. 11, 1954 |
| 246,915 | Switzerland | Feb. 15, 1947 |

OTHER REFERENCES

Frear et al., J. of Economic Entomology, vol. 40, pages 736–741 (1947).